(12) United States Patent
Elzner et al.

(10) Patent No.: US 11,567,098 B2
(45) Date of Patent: Jan. 31, 2023

(54) SENSOR ASSEMBLY AND METHOD FOR PRODUCING A SENSOR ASSEMBLY

(71) Applicant: Robert Bosch GmbH, Stuttgart (DE)

(72) Inventors: Mathias Elzner, Erfurt (DE); Thomas Ullmann, Arnstadt (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 16/769,782

(22) PCT Filed: Oct. 19, 2018

(86) PCT No.: PCT/EP2018/078725
§ 371 (c)(1),
(2) Date: Jun. 4, 2020

(87) PCT Pub. No.: WO2019/115066
PCT Pub. Date: Jun. 20, 2019

(65) Prior Publication Data
US 2020/0309804 A1 Oct. 1, 2020

(30) Foreign Application Priority Data

Dec. 11, 2017 (DE) .......................... 102017222393.6

(51) Int. Cl.
*G01P 1/02* (2006.01)
*G01D 5/14* (2006.01)
(Continued)

(52) U.S. Cl.
CPC .............. *G01P 1/026* (2013.01); *G01D 5/145* (2013.01); *G01D 11/30* (2013.01); *G01P 3/487* (2013.01)

(58) Field of Classification Search
None
See application file for complete search history.

(56) References Cited

U.S. PATENT DOCUMENTS 4,910,459 A * 3/1990 Odagawa ................. G01C 9/06
324/207.13
5,508,611 A 4/1996 Schroeder et al.
(Continued)

FOREIGN PATENT DOCUMENTS

DE 102009000428 A1 7/2010
DE 102014220974 A1 4/2016
(Continued)

OTHER PUBLICATIONS

International Search Report for PCT/EP2018/078725, dated Jan. 21, 2019.

*Primary Examiner* — Nasima Monsur
(74) *Attorney, Agent, or Firm* — Norton Rose Fulbright US LLP; Gerard Messina

(57) ABSTRACT

A sensor assembly comprising a holder body and a housed semiconductor sensor element situated on the holder body for rotational speed measurement and/or position measurement, a cured enveloping material that covers the housed semiconductor sensor element completely being situated on the holder body. It is provided that the housed semiconductor sensor element is glued onto a mounting surface of the holder body using an adhesive that differs from the enveloping material, and that the adhesive is situated in a receiving space between the mounting surface and a bottom side of the housed semiconductor sensor element that is facing the mounting surface.

8 Claims, 1 Drawing Sheet

(51) Int. Cl.
*G01D 11/30* (2006.01)
*G01P 3/487* (2006.01)

(56) References Cited

U.S. PATENT DOCUMENTS

| | | |
|---|---|---|
| 5,963,028 A | 10/1999 | Engel et al. |
| 6,169,316 B1 | 1/2001 | Sakai et al. |
| 2002/0180019 A1* | 12/2002 | Saito ................ H01L 23/10 257/730 |
| 2004/0174164 A1* | 9/2004 | Ao ................... G01D 11/245 324/252 |
| 2007/0145838 A1 | 6/2007 | Uchitani et al. |
| 2009/0140725 A1 | 6/2009 | Ausserlechner |
| 2010/0271015 A1 | 10/2010 | Gruber et al. |
| 2011/0068779 A1 | 3/2011 | Werth et al. |
| 2012/0306031 A1* | 12/2012 | Lo ..................... G01L 19/143 257/E21.501 |

FOREIGN PATENT DOCUMENTS

| | | |
|---|---|---|
| EP | 1757901 A1 | 2/2007 |
| JP | 2014215176 A | 11/2014 |

\* cited by examiner

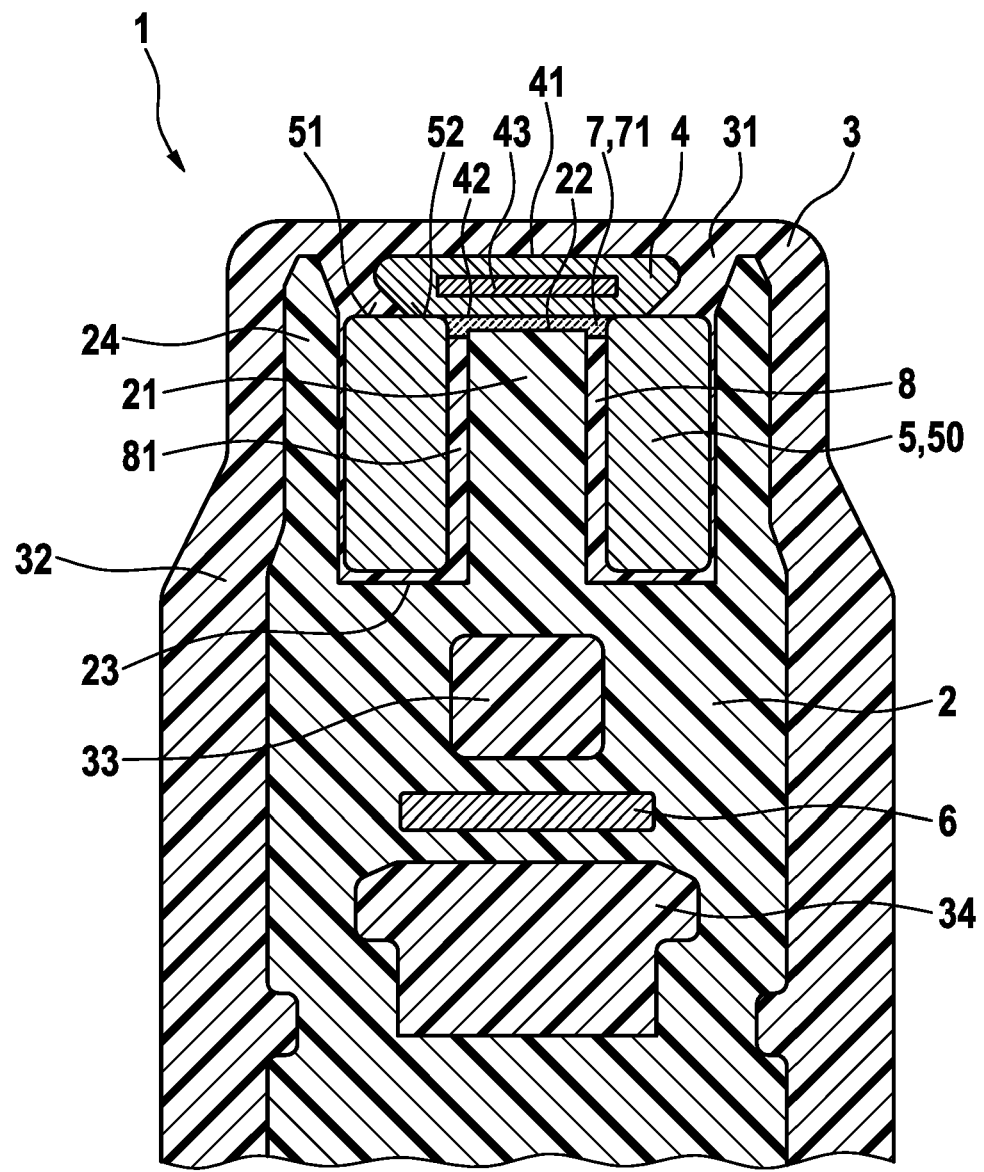

SENSOR ASSEMBLY AND METHOD FOR PRODUCING A SENSOR ASSEMBLY

BACKGROUND INFORMATION

Sensor assemblies, which have a semiconductor sensor element for rotational speed measurement and/or position measurement, are used in manifold ways in the related art. Hall IC components or ASICs (application-specific integrated circuit) having a Hall IC are used for example as housed semiconductor elements, which are embedded in a housing. Such sensors are often used in combination with magnetic or non-magnetic pulse-generator wheels for rotational speed measurement. If a pulse-generator wheel having teeth or tooth gaps rotates in front of the front side of the sensor assembly, this causes a change in the magnetic field at the location of the semiconductor sensor element, which produces an electrical signal as a function of the passing teeth and tooth gaps, from which the rotational speed of the pulse-generator wheel may be determined. Additionally or alternatively, such sensor assemblies may also be used for example in combination with encoded pulse-generator wheels for measuring the position of an absolute angle so that it is possible to detect a specific angle-of-rotation position of a rotating pulse-generator wheel.

German Patent Application No. DE 10 2014 220 974 A1 describes, for example, a sensor assembly, which has a holder body having connector elements situated on it and a housed semiconductor sensor element having contact elements. The housed semiconductor sensor element is situated one mounting surface of the holder body. Connector elements of the semiconductor sensor element are electrically connected to the contact elements. A cured enveloping material situated on the holder body covers the housed semiconductor sensor element entirely. In German Patent Application No. DE 10 2014 220 974 A1, an epoxy resin casting compound is used as the enveloping material.

Other conventional sensor assemblies use an injection-molding compound as the enveloping material. Thus, a sensor assembly is described, for example, in German Patent Application No. DE 10 2009 000 428 A1, which comprises a holder made of a thermoplastic plastic, on which connector elements developed as lead frame parts are injection molded. The connector elements have connecting sections projecting from the sensor system for external contacting of the sensor system. The sensor system furthermore comprises a housed semiconductor sensor element mounted on a mounting surface of the holder, which has contact elements that are electrically connected to the connector elements. For protecting the sensor element and the electrical connecting points, an enveloping material made of thermosetting plastic is applied on the holder. The fully cured enveloping material covers the housed semiconductor sensor element completely.

Furthermore, U.S. Pat. No. 6,169,316 B1, for example, describes sensor assemblies having a semiconductor sensor element used for pressure measurement, in which a semiconductor sensor element is glued onto a mounting surface using an adhesive. In these sensor assemblies, however, the semiconductor sensor element is not integrated into a housing. Furthermore, here the semiconductor sensor element used for measuring pressure fundamentally cannot be covered by a cured enveloping material since then it would no longer be possible to transfer pressure onto the semiconductor sensor element.

SUMMARY

The present invention relates to a sensor assembly comprising a holder body and a housed semiconductor sensor element situated on the holder body for rotational speed measurement and/or position measurement, a cured enveloping material that covers the housed semiconductor sensor element completely being situated on the holder body.

According to an example embodiment of the present invention, the housed semiconductor sensor element is glued onto a mounting surface of the holder body using an adhesive that differs from the enveloping material, the adhesive being situated in a receiving space between the mounting surface and a bottom side of the semiconductor sensor element that is facing the mounting surface. In a particularly advantageous specific embodiment, the supporting surface for the housed semiconductor sensor element may be formed by a front side of an annular magnet facing the semiconductor sensor element. In this case, it is possible for the housed semiconductor sensor element to rest directly on the front side of the annular magnet.

Experience shows that semiconductor materials are susceptible to breakage. In conventional sensor assemblies for rotational speed measurement and/or position measurement, the housed semiconductor sensor element is covered by a cured enveloping material, which may be an epoxy resin material for example. In the application of such an enveloping material, which may also be performed by injection molding for example, forces act on the breakable semiconductor sensor element from all sides, which may result in a displacement of the housed semiconductor sensor element and in the unfavorable case in a breakage of the semiconductor sensor element contained in the housing.

The example sensor assembly according to the present invention advantageously uses an adhesive introduced into a receiving space between a mounting surface of the holder body and a bottom side of the housed semiconductor sensor element for fastening and supporting the housed semiconductor sensor element. This adhesive advantageously fixes the housed semiconductor sensor element in its position while the enveloping material is being applied so that it cannot slip or shift out of place while the enveloping material is being applied. Furthermore, the adhesive situated in the receiving space has the advantageous effect of preventing or minimizing a deformation of the breakable semiconductor sensor element while the enveloping material is being applied and cured. Moreover, the adhesive contained in the receiving space advantageously dampens thermomechanical stresses, which may act on the housed semiconductor sensor element in subsequent operation of the sensor assembly. The adhesive introduced into the receiving space acts like a mechanical damping means that absorbs and compensates for forces acting on the housed semiconductor sensor element so that the semiconductor sensor element is prevented from breaking.

Advantageous refinements and further developments of the present invention are made possible by the features described herein.

Advantageously, the housed semiconductor sensor element may rest with the outer edge region of its bottom side directly on a supporting surface of the holder body surrounding the receiving space or on a supporting surface of another component situated on the holder body which surrounds the receiving space. The supporting surface advantageously allows for a defined orientation of the housed semiconductor sensor element in a direction perpendicular to the mounting surface. This is advantageous especially in the case of Hall ICs or ASICs having a Hall IC, since here the orientation of the Hall IC is an important parameter for the detection of the magnetic field of a pulse-generator wheel.

The mounting surface may be recessed with respect to the supporting surface viewed in a direction perpendicular to the mounting surface, which creates a receiving space for the adhesive in a simple manner. The adhesive may be introduced into this receiving space for example by a dispenser without dirtying the supporting surface.

If the sensor assembly has a magnet, which is required for example in combination with a passive magnetic pulse-generator wheel, then an annular groove may advantageously be inserted in the holder body of the sensor assembly, which encircles a mounting base formed on the holder body, the mounting surface being developed on a side of the mounting base facing the housed semiconductor sensor element and an annular magnet being situated in the annular groove as a further component of the sensor assembly. The annular magnet may be fastened in the annular groove by clamping for example.

If an annular magnet is used, the supporting surface for the housed semiconductor sensor element may be formed advantageously by a front side of the annular magnet facing the housed semiconductor sensor element. In this case, the housed semiconductor sensor element advantageously rests directly on the front side of the annular magnet.

There may be a gap between the annular magnet and the inner walls of the annular groove. Using clamping jaws or clamping ribs for example, which may be situated in the gap, it is possible to hold the annular magnet at a distance from the inner walls of the annular groove. This creates a gap that connects the receiving space with the exterior space. When applying the adhesive in the receiving space and/or when pressing the housed semiconductor sensor element against the adhesive, the latter is able to spread a bit into the gap. The gap may therefore be advantageous as a channel for adhesive displaced during the joining process.

In a later method step, the gap may be filled from outside with a molding compound. The molding compound may also be formed by the enveloping material, which is cured during or following the application.

The sensor assembly may have a wall, which projects beyond the mounting surface from a side of the holder body facing the housed semiconductor sensor element in the direction of the housed semiconductor sensor element and which embraces the annular groove. Advantageously, this wall is able to absorb the elastic forces when pressing the annular magnet into the annular groove.

Furthermore, advantageously, an example method is provided in accordance with the present invention for producing a sensor assembly in which at first a housed semiconductor sensor element is provided for measuring rotational speed and/or for measuring position. In addition, a holder body is provided, which has a mounting surface, a supporting surface encircling the mounting surface being formed on the holder body or on a further component situated on the holder body, the mounting surface being recessed with respect to the supporting surface seen in a direction perpendicular to the mounting surface, a receiving space advantageously being formed thereby. The holder body may be produced for example by a thermoplastic spraying process, in which lead frame parts used as electrical connector elements are coated with an injection molding compound.

In the example method according to the present invention, first an adhesive is applied for example using a dispenser or a dosing dosing mechanism onto the mounting surface within the receiving space, it being possible for the receiving space to be filled with the adhesive approximately up to or just below the level of the supporting surface. Preferably, an adhesive may be used that has sufficient viscosity to form an adhesive drop or mound on the mounting surface, which extends up to the level of the supporting surface. Subsequently, the housed semiconductor sensor element is set with its bottom side facing the mounting surface directly onto the supporting surface. In the process, the area of the bottom side between the edge surface makes contact with the adhesive, which presses the adhesive and displaces it into the receiving space. A gap in the receiving space is advantageously able to receive displaced adhesive. In the final position, the housed semiconductor sensor element rests with the outer edge area of its bottom side directly on the supporting surface, and the adhesive fills the entire receiving space below the housed semiconductor sensor element. At the end, the holder body may be provided with the enveloping material. This may be done for example by injection molding using a thermoplastic for example. The enveloping material entirely covers at least the housed semiconductor sensor element and may in addition also form the outer jacket of the sensor assembly for example.

BRIEF DESCRIPTION OF THE DRAWING

FIG. 1 shows a schematic of the sensor assembly for an exemplary embodiment of the present invention.

DETAILED DESCRIPTION OF EXAMPLE EMBODIMENTS

FIG. 1 shows a detail of a cross section through the head section of a sensor assembly 1.

Sensor assembly 1 has a holder body 2 made of plastic for example. Holder body 2 may be produced for example as an injection molded part by spray-coating metallic lead frame strips 6. In a head section of holder body 2, an annular groove 23 is provided, which may be situated concentrically around a mounting base 21. At the extreme, a mounting surface 22 is formed on mounting base 21. Mounting surface 22 is preferably formed as a flat surface. Annular groove 23 may be flanked by a, preferably elastic, circumferential wall 24 formed on holder body 2, which may project a bit beyond it in the direction toward mounting surface 22.

A component 5 is pressed into annular groove 23, which may be for example an annular magnet 50 of sensor assembly 1. For this purpose, clamping arrangement (not shown) may be situated on the inner wall of annular groove 23, which make it possible to clamp annular magnet 50 in annular groove 23.

As may be seen in FIG. 1, annular magnet 50 may be spaced apart from the inner wall of annular groove 24 by a gap 8, which is U-shaped when viewed in the half-side cross section of the annular magnet. The front side 51 of annular magnet facing away from holder body 2 forms a supporting surface 52 for a housed semiconductor sensor element 4. Supporting surface 52, however, may also be developed, otherwise than shown, on another component 5 or directly on holder body 2.

Housed semiconductor sensor element 4 may comprise as semiconductor sensor element for example a Hall IC or an ASIC (application-specific integrated circuit) including a Hall component, which is provided for rotational speed measurement or position determination. The semiconductor sensor element is provided in FIG. 1 with reference numeral 43. Semiconductor sensor element 43, for example on the basis of silicon, is provided with a housing made of epoxy resin for example and has electrical contacts (not shown). Together with the housing, semiconductor sensor element 43 forms housed semiconductor sensor element 4. Housed semiconductor sensor element 4 is designed to detect a magnetic signal applied on a sensor side 41 of housed semiconductor sensor element 4. Housed semiconductor sensor element 4 has a bottom side 42 facing away from sensor side 41, which is developed for example in parallel to sensor side 41.

Housed semiconductor sensor element 4 rests directly on supporting surface 52 circumferentially with the outer edge area of its bottom side 42. As may be seen clearly in FIG. 1, mounting surface 22 is recessed with respect to supporting surface 52, viewed in a direction perpendicular to mounting surface 22, so that a receiving space 7 is created. An adhesive 71 is situated in receiving space 7. In the process of setting semiconductor sensor element 4 onto supporting surface 52, adhesive 71 may be displaced into receiving space 7 and penetrate gap 8 for example. Adhesive 71 may fill up receiving space 7 between mounting surface 22 and bottom side 42 of housed semiconductor sensor element 4. Semiconductor sensor element 4 is thereby fixed in its position on holder body 2 for a subsequent application process of enveloping material 3.

Enveloping material 3 may be applied on holder body in a transfer molding process or injection molding process for example. Enveloping material 3 may comprise an epoxy resin, a thermosetting plastic or (preferably) a thermoplastic material. Enveloping material 3 may form a cap-like cover 31 over semiconductor sensor element 4 and may furthermore form an outer jacket 32 connected therewith in one piece, which firmly abuts on the lateral walls of holder body 2.

Enveloping material 3 may furthermore also penetrate cut-outs of holder body 2 provided for this purpose in areas 33 and 34 for example. In the cured state, it is no longer possible to remove enveloping material 3 from holder body 2 in a non-destructive manner for example.

Enveloping material 3 may also penetrate gap 8 from front side 51 for example and may fill gap 8 entirely or partially, as shown. Alternatively, prior to applying enveloping material 3, a molding compound 81 may be introduced into the gap.

The production of the sensor assembly proceeds as follows. First, adhesive 71 is applied using for example a dispenser within receiving space 7 onto mounting surface 22, it being possible to fill receiving space 7 in the process with adhesive 71 approximately up to or just below the level of supporting surface 52. Preferably, an adhesive may be used that has sufficient viscosity to form an adhesive drop or mound on mounting surface 22, which extends up to the level of the supporting surface 52. Subsequently, the housed semiconductor sensor element 4 is set with its bottom side 42 facing mounting surface 22 directly onto the supporting surface 52. In the process, the area of bottom side 42 between the edge surface makes contact with adhesive 71, whereby the latter is displaced into receiving space 7. Gap 8 may advantageously receive displaced adhesive. In the final position, housed semiconductor sensor element 4 rests as shown with the outer edge area of its bottom side 42 directly on supporting surface 52, and adhesive 71 fills up the entire receiving space 8 below semiconductor sensor element 4, whereby the housed semiconductor sensor element is fixed in its position. Electrical contacts (not shown) of housed semiconductor sensor element 4 may be contacted with electrical connector elements (likewise not shown in FIG. 1) of the holder body. This may occur, for example, in a manner similar to that described in German Patent Application No. DE 10 2014 220 974 A1.

Finally, holder body 2 may be provided with enveloping material 3, for example by injection molding, enveloping material 3 covering at least housed semiconductor sensor element 4 and being able furthermore also to form the outer jacket of sensor assembly 1 for example.

What is claimed is:

1. A sensor assembly, comprising:
    a holder body;
    a housed semiconductor sensor element situated on the holder body configured for rotational speed measurement and/or position measurement; and
    a cured enveloping material covering the housed semiconductor sensor element and completely situated on the holder body;
    wherein the housed semiconductor sensor element is glued onto a mounting surface of the holder body using an adhesive that differs from the enveloping material, and the adhesive is situated in a receiving space between the mounting surface and a bottom side of the housed semiconductor sensor element that is facing the mounting surface,
    wherein the housed semiconductor sensor element rests with an outer edge region of the bottom side directly on a supporting surface of the holder body, which supporting surface is surrounding the receiving space or on a supporting surface of another component situated on the holder body which supporting surface surrounds the receiving space,
    wherein the supporting surface and the mounting surface are not situated on a same level, and
    wherein the outer edge region of the housed semiconductor sensor is not glued onto the mounting surface,
    wherein the mounting surface is recessed with respect to the supporting surface, viewed in a direction perpendicular to the mounting surface, to thereby create the receiving space.

2. The sensor assembly as recited in claim 1, wherein an annular groove is in the holder body, wherein the annular groove encircles a mounting base formed on the holder body, the mounting surface being formed on a side of the mounting base facing the housed semiconductor sensor element and an annular magnet being situated in the annular groove as the another component of the sensor assembly.

3. The sensor assembly as recited in claim 2, wherein the annular magnet is held clamped in the annular groove.

4. The sensor assembly as recited in claim 2, wherein the supporting surface is formed by a front side of the annular magnet facing the housed semiconductor sensor element.

5. The sensor assembly as recited in claim 2, wherein a gap between the annular magnet and inner walls of the annular groove is filled by a molding compound.

6. The sensor assembly as recited in claim 5, wherein the molding compound is formed by the cured enveloping material.

7. The sensor assembly as recited in claim 4, wherein from a side of the holder body facing the housed semiconductor sensor element, a wall embracing the annular groove projects beyond the mounting surface in a direction of the housed semiconductor sensor element.

8. A method for producing a sensor assembly, comprising the following steps:
    providing a housed semiconductor sensor element configured for rotational speed measurement and/or position measurement;
    providing a holder body which has a mounting surface, a supporting surface encircling the mounting surface being formed on the holder body or on a further component situated on the holder body, the mounting surface being recessed with respect to the supporting surface viewed in a direction perpendicular to the mounting surface, whereby a receiving space is formed;

applying an adhesive within the receiving space onto the mounting surface;

setting the housed semiconductor sensor element with its bottom side facing the mounting surface directly onto the supporting surface and the adhesive; and applying a cured enveloping material covering the housed semiconductor sensor element on the holder body, wherein the housed semiconductor sensor element is glued onto the mounting surface of the holder body using the adhesive that differs from the enveloping material, and the adhesive is situated in the receiving space between the mounting surface and the bottom side of the housed semiconductor sensor element that is facing the mounting surface, wherein the housed semiconductor sensor element rests with an outer edge region of the bottom side directly on the supporting surface of the holder body, which supporting surface is surrounding the receiving space or on a supporting surface of another component situated on the holder body which supporting surface surrounds the receiving space, wherein the supporting surface and the mounting surface are not situated on a same level, and wherein the outer edge region of the housed semiconductor sensor is not glued onto the mounting surface, wherein the mounting surface is recessed with respect to the supporting surface, viewed in a direction perpendicular to the mounting surface, to thereby create the receiving space.

* * * * *